(12) United States Patent
Otomo

(10) Patent No.: US 11,471,766 B2
(45) Date of Patent: Oct. 18, 2022

(54) INFORMATION PROCESSING DEVICE AND PROGRAM

(71) Applicant: KABUSHIKI KAISHA SEGA GAMES, Tokyo (JP)

(72) Inventor: Takahiro Otomo, Tokyo (JP)

(73) Assignee: KABUSHIKI KAISHA SEGA GAMES, Tokyo (JP)

( * ) Notice: Subject to any disclaimer, the term of this patent is extended or adjusted under 35 U.S.C. 154(b) by 103 days.

(21) Appl. No.: 16/755,708

(22) PCT Filed: Sep. 14, 2018

(86) PCT No.: PCT/JP2018/034292
§ 371 (c)(1),
(2) Date: Mar. 29, 2021

(87) PCT Pub. No.: WO2019/077923
PCT Pub. Date: Apr. 25, 2019

(65) Prior Publication Data
US 2021/0252396 A1 Aug. 19, 2021

(30) Foreign Application Priority Data
Oct. 17, 2017 (JP) .............................. JP2017-201439

(51) Int. Cl.
*A63F 13/00* (2014.01)
*A63F 13/493* (2014.01)
(Continued)

(52) U.S. Cl.
CPC ............. *A63F 13/493* (2014.09); *A63F 13/58* (2014.09); *A63F 13/69* (2014.09); *A63F 13/79* (2014.09)

(58) Field of Classification Search
CPC .......... A63F 13/79; A63F 13/69; A63F 13/45; A63F 13/44; A63F 13/46
See application file for complete search history.

(56) References Cited

U.S. PATENT DOCUMENTS

2011/0244952 A1* 10/2011 Schueller ............ G07F 17/3262
463/27
2016/0041661 A1* 2/2016 Bertel ................... A63F 13/795
463/31

FOREIGN PATENT DOCUMENTS

| JP | 2013198543 A | 10/2013 |
| JP | 2014168709 A | 9/2014 |

(Continued)

OTHER PUBLICATIONS

International Search Report and the Written Opinion of the International Searching Authority, issued in corresponding International Application No. PCT/JP2018/034292, dated Dec. 4, 2018, 7 pages.

(Continued)

*Primary Examiner* — David L Lewis
*Assistant Examiner* — Eric M Thomas
(74) *Attorney, Agent, or Firm* — Rothwell, Figg, Ernst & Manbeck, P.C.

(57) ABSTRACT

It is an object of the present invention to allow the points allotted for time restoration to be easily obtained even after automatic restoration. The information processing device of the present invention comprises a user information storage unit that stores a user's possessed points; a game progression unit that permits game play by the consumption of the user's possessed points; an automatic restoration unit that automatically restores the user's possessed points to a value between a first maximum value and a second maximum value when a restoration condition is satisfied; a manual restoration unit that restores the user's possessed points to a value between the first maximum value and the second maximum value by means of a restoration operation by the user; and a time restoration unit that restores the user's possessed points according to the elapsed time until the first maximum value is reached, and that, after the user's possessed points have been restored by the automatic restora- (Continued)

tion unit from among the automatic restoration unit, the manual restoration unit, and the time restoration unit, restores the user's possessed points according to the elapsed time until the second maximum value is reached.

6 Claims, 11 Drawing Sheets

(51) Int. Cl.
*A63F 13/58* (2014.01)
*A63F 13/69* (2014.01)
*A63F 13/79* (2014.01)

(56) References Cited

FOREIGN PATENT DOCUMENTS

JP  2016083346 A  5/2016
JP  2017136407 A  8/2017

OTHER PUBLICATIONS

Cat Energy, Battle Cats Wiki [online], Jul. 24, 2017, [retrieval date Nov. 16, 2018], internet, <URL:http://battle-cats/wiki/Cat_Energy?oldid=130445>, 1 page.

* cited by examiner

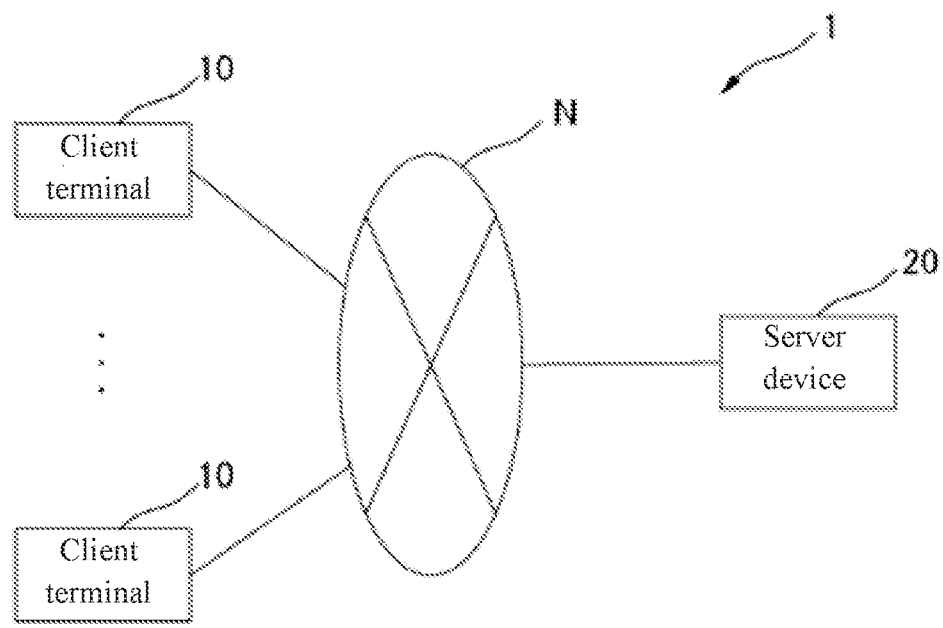
[FIG. 1]
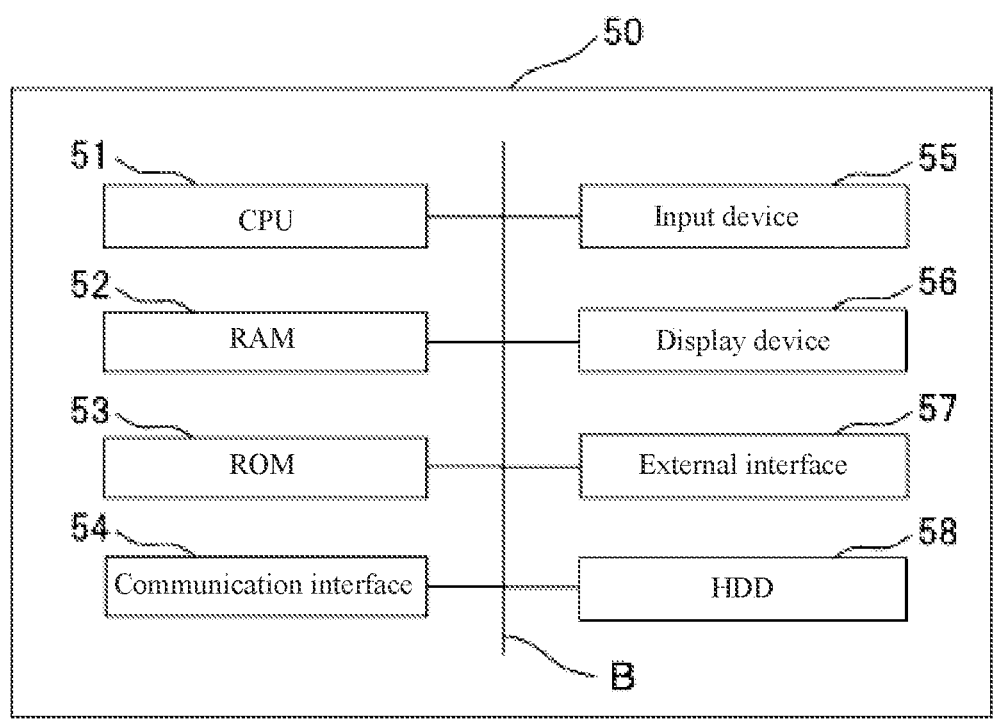
[FIG. 2]

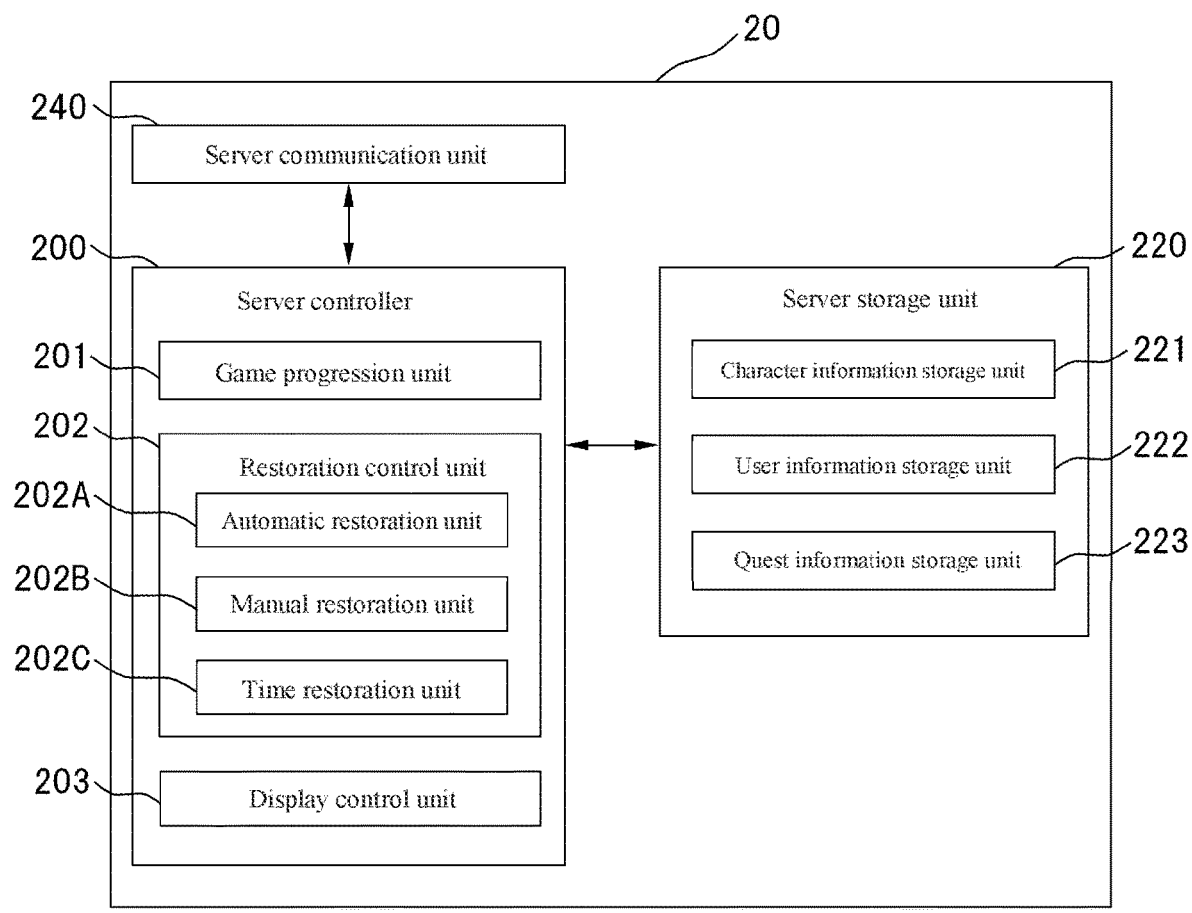
[FIG. 3]

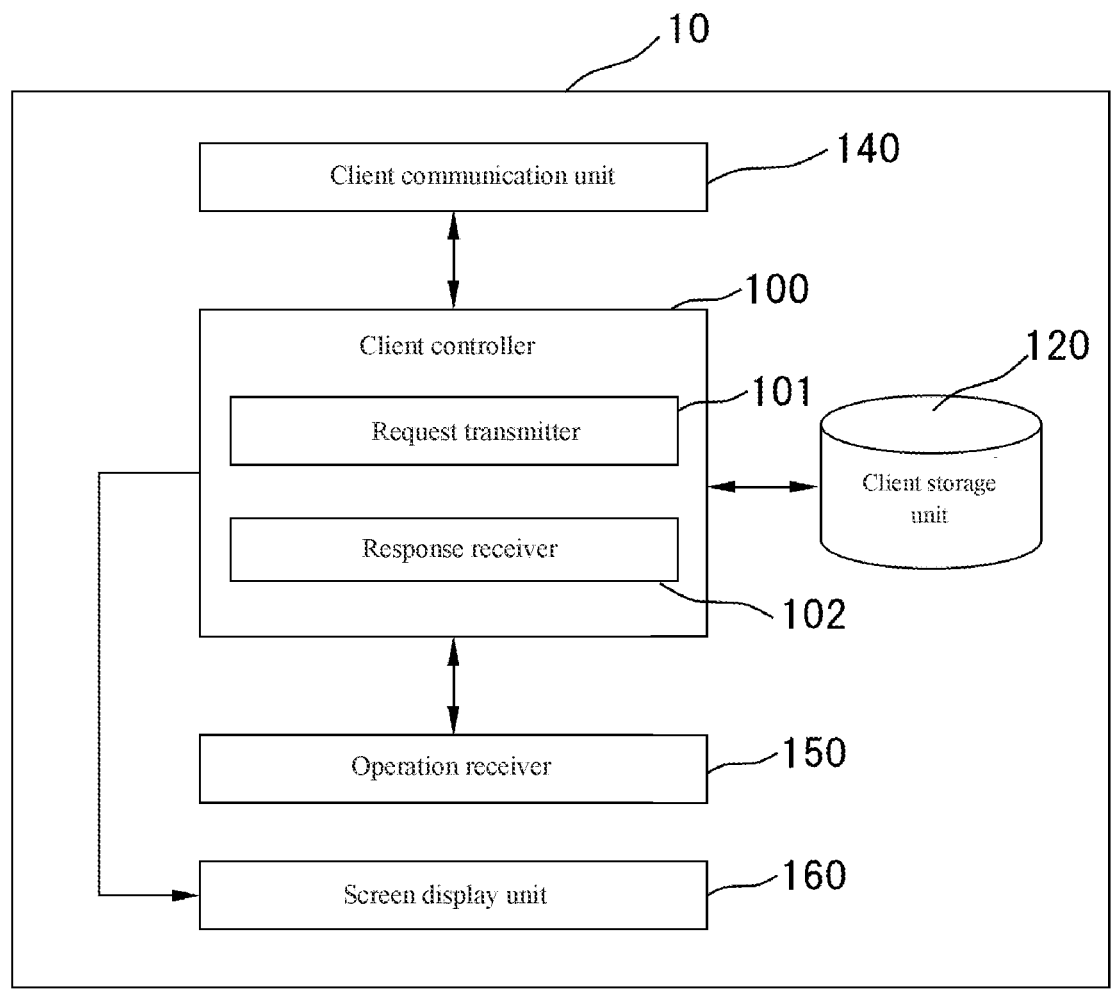
[FIG. 4]

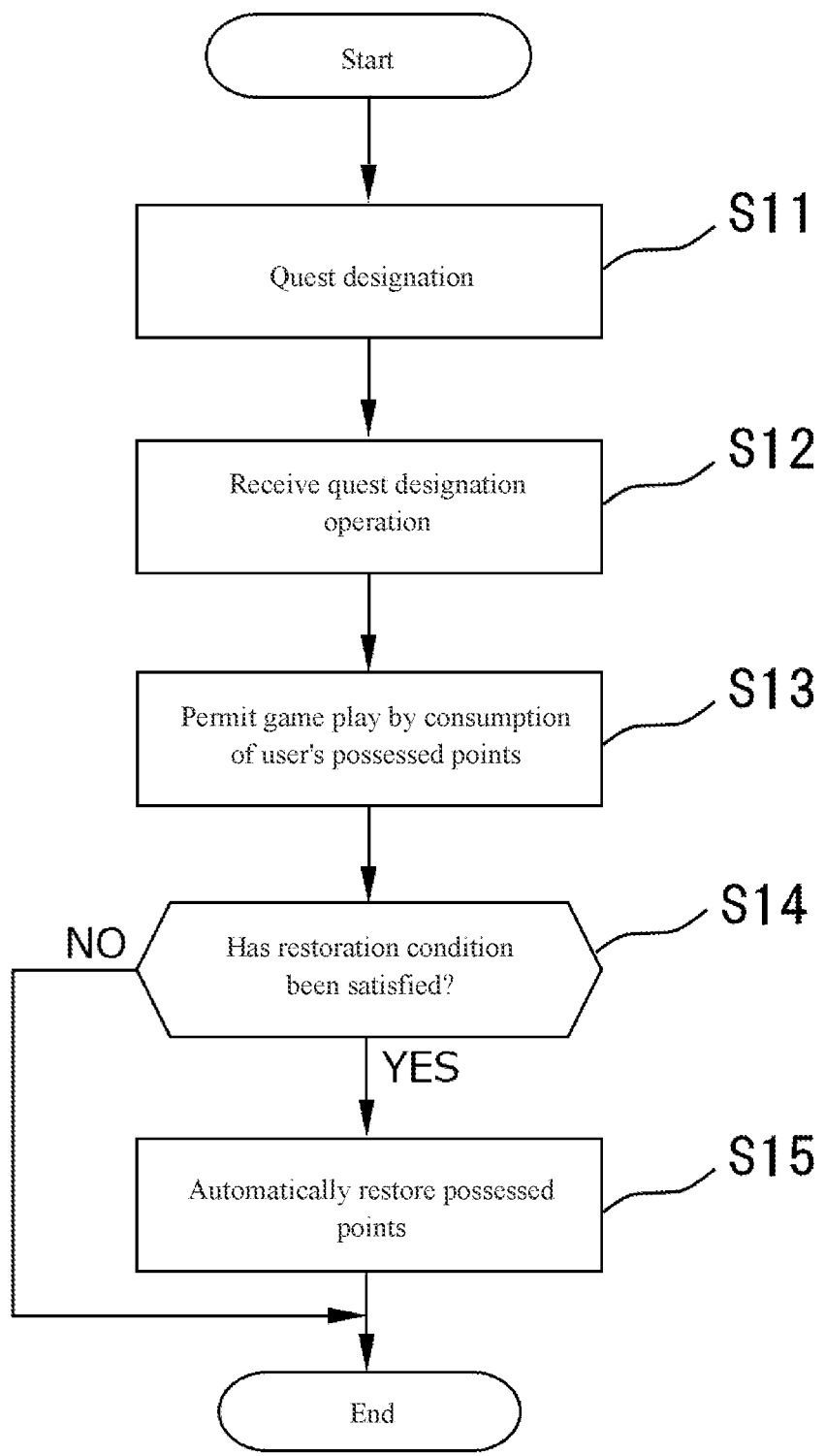
[FIG. 5]

| Quest ID | Quest name | Required points | Enemy characters | Acquirable characters | ... |
|---|---|---|---|---|---|
| q001 | Quest A | 10 | c025 | c002, ... | ... |
| q002 | Quest B | 20 | c111 | c004, ... | ... |
| ... | ... | ... | ... | ... | ... |

[FIG. 6]

| User ID | Name | Rank | Possessed characters | Party | Possessed points | First maximum value | Second maximum value | No. of restored items | ... |
|---|---|---|---|---|---|---|---|---|---|
| 0001 | User A | 10 | c051, ... | c051, ... | 50 | 105 | 260 | 3 | ... |
| 0002 | User B | 15 | c005, ... | c005, ... | 80 | 120 | 240 | 50 | ... |
| 0003 | User C | 25 | c099, ... | c099, ... | 125 | 135 | 280 | 0 | ... |
| ... | ... | ... | ... | ... | ... | ... | ... | ... | ... |

[FIG. 7]

<Before automatic restoration>
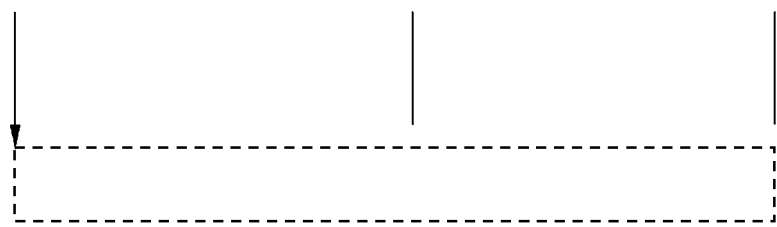
<After automatic restoration>
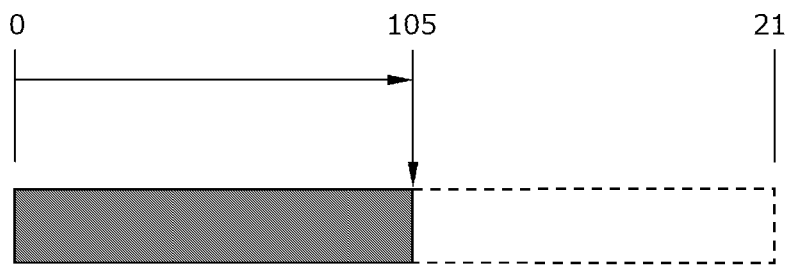
[FIG. 8]

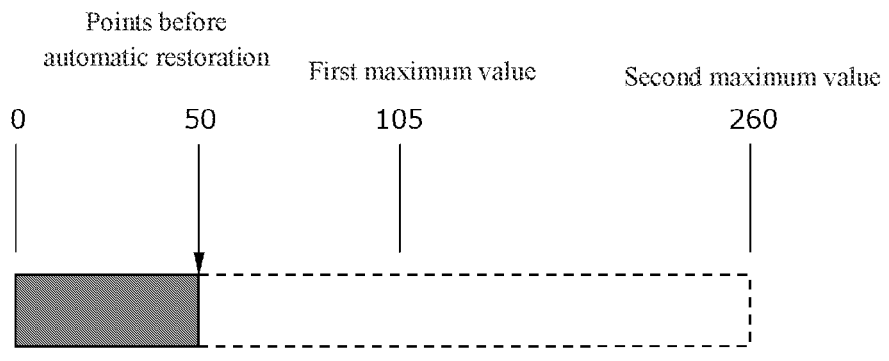
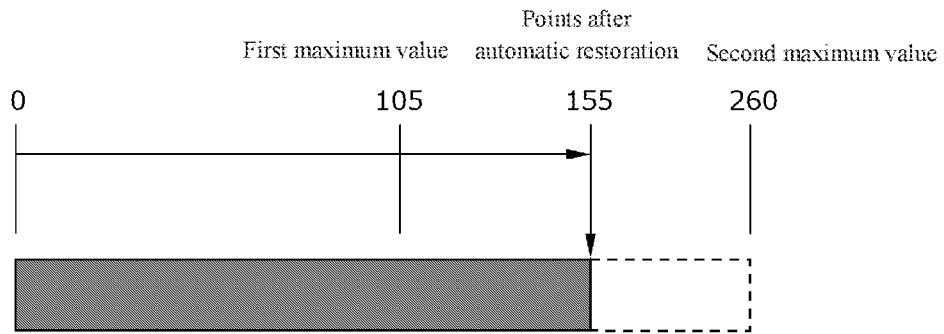
[FIG. 9]

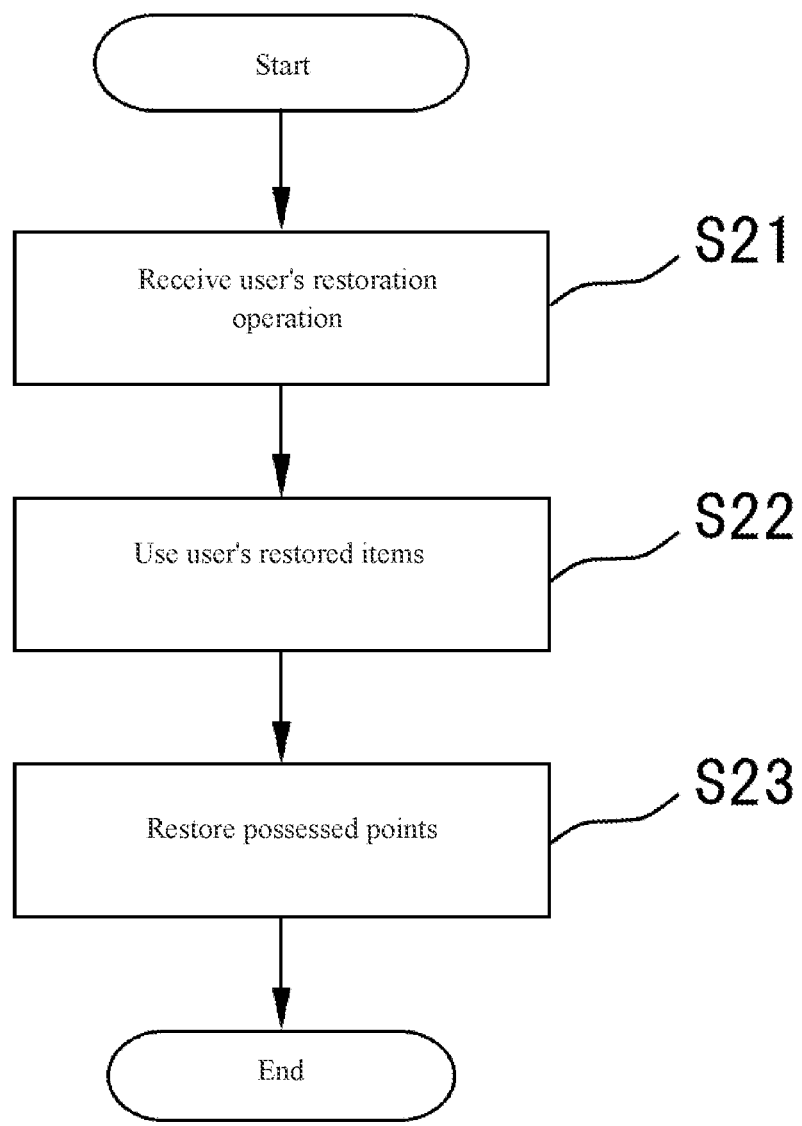
[FIG. 10]

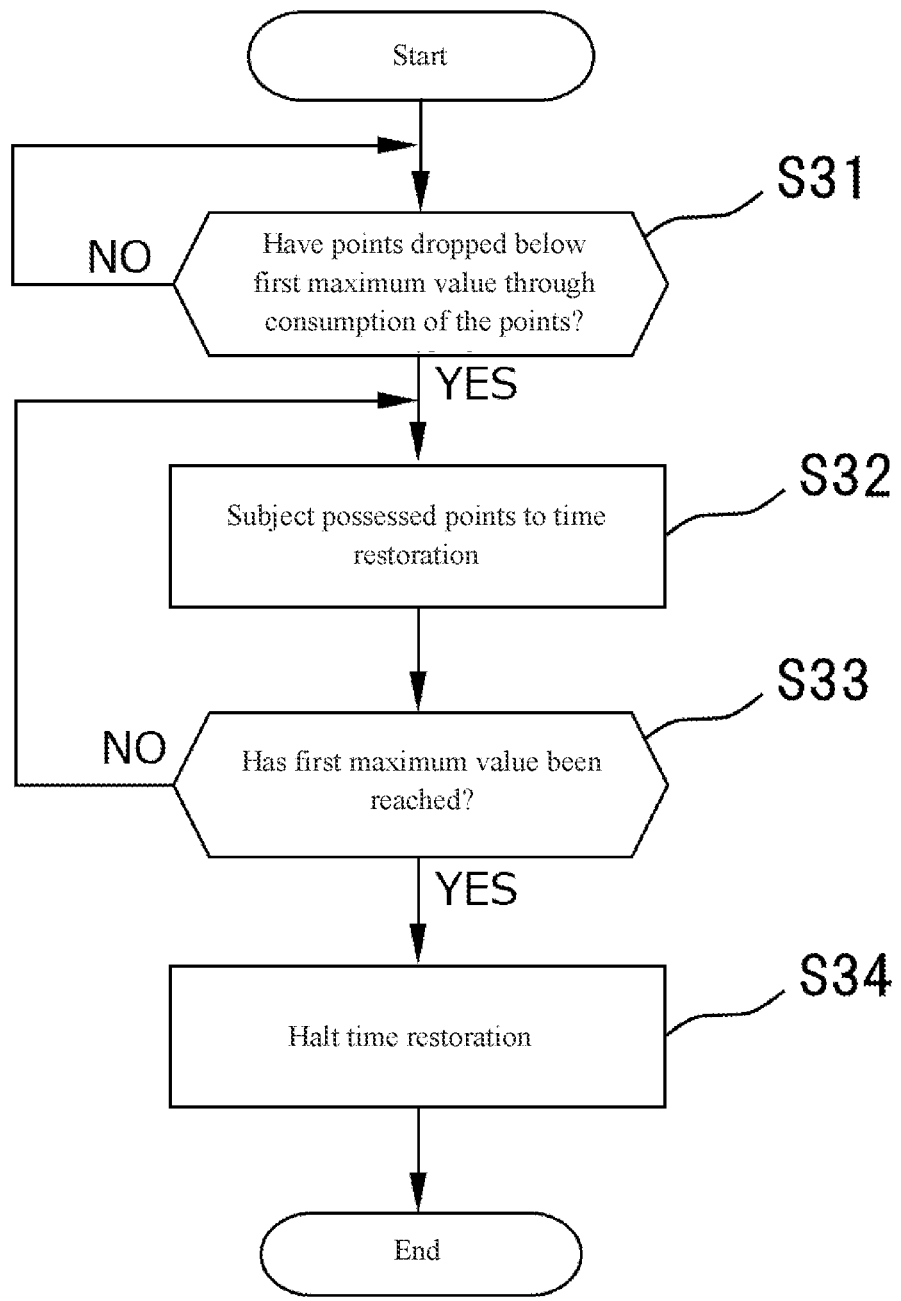
[FIG. 11]

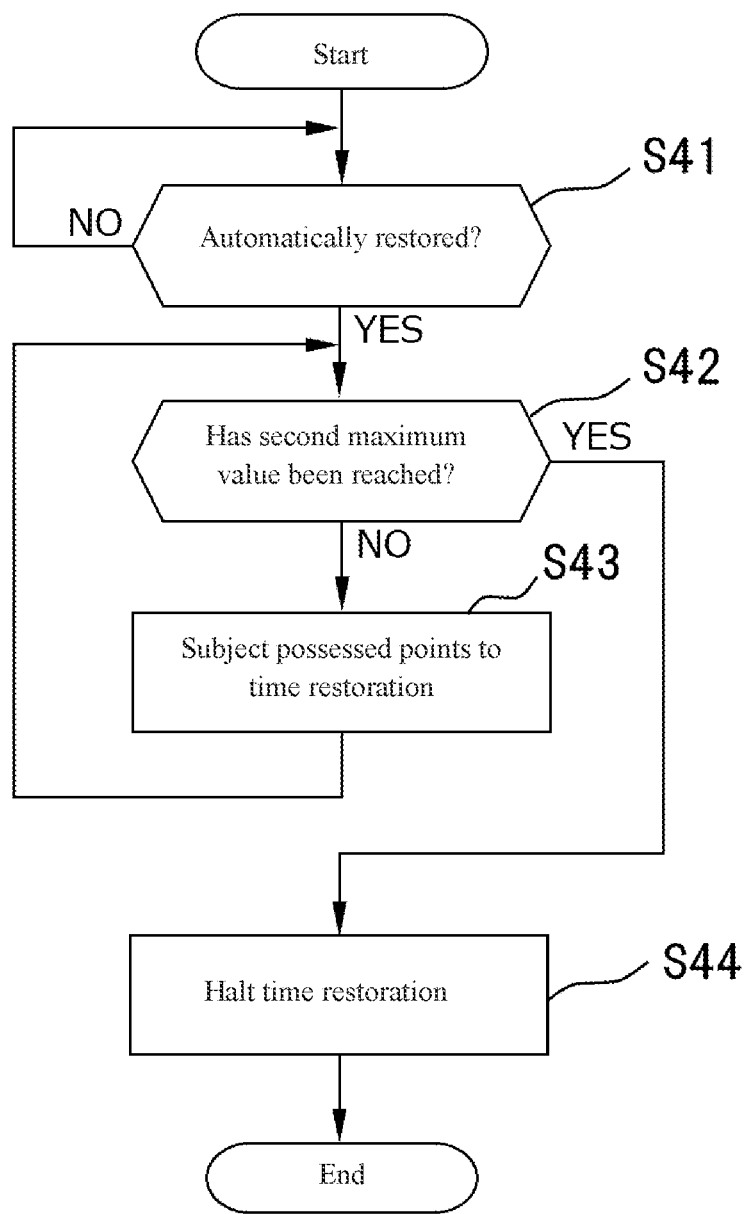
[FIG. 12]

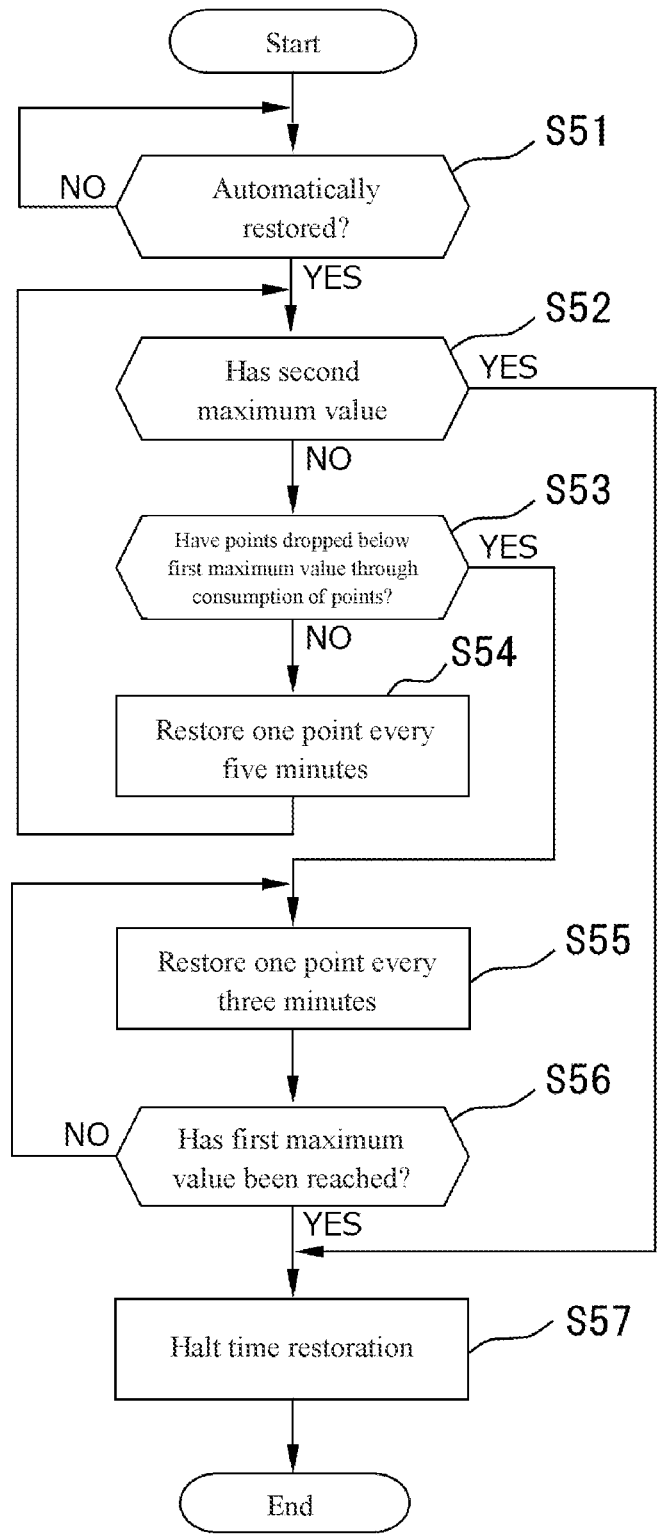
[FIG. 13]

INFORMATION PROCESSING DEVICE AND PROGRAM

CROSS-REFERENCE TO RELATED APPLICATIONS

The present application is a national stage entry of PCT/JP2018/034292 filed on Sep. 14, 2018, which is based upon and claims the benefit of priority from Japanese Patent Application No. 2017-201439, filed on Oct. 17, 2017, the disclosure of which is incorporated herein in its entirety by reference.

BACKGROUND

Technical Field

The present invention relates to an information processing device and a game program (e.g., non-transitory computer readable medium having machine-executable instructions with which a computer having a storage and a hardware processor, for providing a service).

Related Art

There are known games in which game play is permitted by the consumption of a user's possessed points, and the consumed possessed points are gradually restored over time, or are restored all at once by a user restoration operation.

In this game, even though the user intends to restore consumed possessed points over time after the user has used up all his possessed points and ended game play, the restoration may still end up being performed automatically due to the fact that a restoration condition (such as a rank being increased) is satisfied independent of any operation by the user.

Thus, if the user's possessed points are automatically restored against the user's wishes, time restoration will not be performed thereafter, so any points that would have been restored during the time between the end of game play until the game is restarted will not be obtained, and the user will end up suffering this loss. Therefore, the user has to repeat the game play after the automatic restoration and consume his possessed points, otherwise the points allotted for that time restoration will be lost.

SUMMARY OF THE INVENTION

The present invention was conceived in light of this situation, and it is an object thereof to allow a user to easily obtain the points allotted for a time restoration even after automatic restoration.

The main invention of the present invention for solving the above problems is:

an information processing device, comprising:
a user information storage unit that stores user information in which a user's possessed points are set;
a game progression unit that permits game play by the consumption of the user's possessed points;
an automatic restoration unit that automatically restores the user's possessed points to a value between a first maximum value and a second maximum value, when a restoration condition is satisfied independent of any restoration operation by the user;
a manual restoration unit that restores the user's possessed points to a value between the first maximum value and the second maximum value by means of a restoration operation by the user; and
a time restoration unit that restores the user's possessed points according to the elapsed time until the first maximum value is reached, and that, after the user's possessed points have been restored by the automatic restoration unit from among the automatic restoration unit, the manual restoration unit, and the time restoration unit, restores the user's possessed points according to the elapsed time until the second maximum value is reached.

Other features of the present invention will become apparent from the description of the detailed description of the invention and the accompanying drawings.

BRIEF DESCRIPTION OF DRAWINGS

FIG. 1 is a configuration diagram showing an example of an information processing system pertaining to this embodiment;

FIG. 2 is a hardware configuration diagram showing an example of a computer pertaining to this embodiment;

FIG. 3 is a functional block diagram showing an example of a server device pertaining to this embodiment;

FIG. 4 is a functional block diagram showing an example of a client terminal pertaining to this embodiment;

FIG. 5 is a flowchart illustrating an operation example related to automatic restoration in the information processing system 1 in this embodiment;

FIG. 6 is a configuration diagram showing an example of quest information;

FIG. 7 is a configuration diagram showing an example of user information;

FIG. 8 is a diagram showing a restoration state (Example 1) of the possessed points before and after automatic restoration;

FIG. 9 is a diagram showing a restoration state (Example 2) of the possessed points before and after automatic restoration;

FIG. 10 is a flowchart illustrating an operation example related to manual restoration in the information processing system 1 in this embodiment;

FIG. 11 is a flowchart illustrating an operation example related to time restoration in the information processing system 1 in this embodiment (Specific Example 1);

FIG. 12 is a flowchart illustrating an operation example related to time restoration in the information processing system 1 in this embodiment (Specific Example 2); and FIG. 13 is a flowchart illustrating an operation example related to time restoration in the information processing system 1 in this embodiment (Specific Example 3).

DETAILED DESCRIPTION OF THE INVENTION

At least the following matters will become apparent from the detailed description of the invention and the accompanying drawings.

Specifically, one mode of the present invention is an information processing device, comprising:
a user information storage unit that stores user information in which a user's possessed points are set;
a game progression unit that permits game play by the consumption of the user's possessed points;
an automatic restoration unit that automatically restores the user's possessed points to a value between a first maximum value and a second maximum value, when a restoration condition is satisfied independent of any restoration operation by the user;

a manual restoration unit that restores the user's possessed points to a value between the first maximum value and the second maximum value by means of a restoration operation by the user; and a time restoration unit that restores the user's possessed points according to the elapsed time until the first maximum value is reached, and that, after the user's possessed points have been restored by the automatic restoration unit from among the automatic restoration unit, the manual restoration unit, and the time restoration unit, restores the user's possessed points according to the elapsed time until the second maximum value is reached.

With this information processing device, when the user's possessed points are consumed, those possessed points can be subjected to time restoration until the first maximum value is reached, and after automatic restoration, the points can be subjected to time restoration until the second maximum value is reached. Therefore, even if the user's possessed points are automatically restored against the user's wishes, thereafter they will be subjected to time restoration until the second maximum value is reached, so after automatic restoration, there is no need to keep playing the game and consuming one's own possessed points so as to drop under the first maximum value. As a result, the user can easily obtain the points allotted for the time restoration even after automatic restoration.

Also, the time restoration unit preferably only restores the user's possessed points up until the first maximum value is reached according to the elapsed time when the user's possessed points have dropped below the first maximum value due to consumption by the game progression unit after automatic restoration by the automatic restoration unit.

As a result, if the user's possessed points are consumed and drop below the first maximum value after automatic restoration, those possessed points can be subjected to time restoration only until the first maximum value is reached. In other words, in the time restoration of the possessed points after automatic restoration, if the possessed points were intentionally consumed by the user until dropping below the first maximum value, the points allotted for the time restoration until the second maximum value is reached will not be obtained. As a result, the user will keep playing the game until he uses up all his possessed points in order to obtain the points allotted for the time restoration until the first maximum value is reached, and this helps make the game more dynamic.

Also, the time restoration unit preferably does not restore the user's possessed points according to the elapsed time after consumption when the user's possessed points are consumed by the game progression unit after the automatic restoration by the automatic restoration unit and before the user's possessed points are restored to the second maximum value according to the elapsed time, and the consumed user's possessed points have not dropped below the first maximum value.

Consequently, in the time restoration of the possessed points after automatic restoration, if the user has intentionally consumed his possessed points even once, the points allotted for the time restoration until the second maximum value is reached will not be obtained. As a result, the user will keep playing the game until he uses up all his possessed points in order to obtain the points allotted for the time restoration until the first maximum value is reached, and this helps make the game more dynamic.

Also, the amount of restoration of the user's possessed points per unit of time by the time restoration unit is preferably different when the user's possessed points are restored according to the elapsed time until the first maximum value is reached, and when the user's possessed points are restored according to the elapsed time until the second maximum value is reached.

Consequently, if, for example, the amount of possessed points restored per unit of time is greater (if the restoration occurs quickly) in the time restoration until the second maximum value is reached than in the time restoration until the first maximum value is reached, it will be easier for the user's possessed points to reach the second maximum value soon after the automatic restoration. Therefore, the user restarts the game play immediately after reaching the second maximum value and consumes his possessed points, which helps make the game more dynamic. Also, if, for example, the amount of possessed points restored per unit of time is less (if the restoration occurs slowly) in the time restoration until the second maximum value is reached than in the time restoration until the first maximum value is reached, it will be more difficult for the user's possessed points to reach the second maximum value after the automatic restoration. Therefore, the user will seek a time restoration in which the possessed points will easily reach the first maximum value, and will keep playing the game and consuming his possessed points so that they drop below the first maximum value, and this helps make the game more dynamic.

Also, the second maximum value is preferably a value that is added to the first maximum value with respect to the value automatically restored by the automatic restoration unit.

Consequently, the user can easily obtain a greater allotment of points for time restoration even after automatic restoration.

Another mode of the present invention is a computer-readable recording medium for the non-transitory storage of a program that is executed by a computer comprising a processor and a memory, wherein said program causes the computer to function as:

a user information storage means for storing user information in which a user's possessed points are set;

a game progression means for permitting game play by the consumption of the user's possessed points;

an automatic restoration means for automatically restoring the user's possessed points to a value between a first maximum value and a second maximum value, when a restoration condition is satisfied independent of any restoration operation by the user;

a manual restoration means for restoring the user's possessed points to a value between the first maximum value and the second maximum value by means of a restoration operation by the user; and a time restoration means for restoring the user's possessed points according to the elapsed time until the first maximum value is reached, and for, after the user's possessed points have been restored by the automatic restoration unit from among the automatic restoration unit, the manual restoration unit, and the time restoration unit, restoring the user's possessed points according to the elapsed time until the second maximum value is reached.

With this program, the points allotted for time restoration can be easily obtained even after automatic restoration.

The information processing device, the program, and the information processing system pertaining to an embodiment of the present invention will now be described in detail. The present invention can be broadly applied to an information processing device, a program, an information processing system, etc., that employs a game in which the consumption of possessed points and restoration over time are repeated.

System Configuration

FIG. 1 is a configuration diagram showing an example of the information processing system 1 pertaining to this embodiment. As shown in FIG. 1, in the information processing system 1 pertaining to this embodiment, one or more client terminals 10 and a server device 20 are connected via a network N.

The client terminal 10 is a terminal device such as a PC, a smartphone, a tablet, or the like operated by a user, or is a terminal device such as a dedicated game device for home or commercial use. The server device 20 manages and controls a game played by the user on the client terminal 10, performs billing processing within the game, and so forth. The network N is the Internet or the like, and includes a mobile wireless base station and the like.

The present invention can be applied to a client/server type of information processing system 1 as shown in FIG. 1, as well as to a single game device by additionally providing some way to perform billing processing within the game. It should go without saying that the information processing system 1 in FIG. 1 is just an example, and that various system configurations are possible depending on the application and purpose. For instance, the server device 20 in FIG. 1 may be configured to be distributed among a plurality of computers.

Hardware Configuration

Client Terminal and Server Device

FIG. 2 is a hardware configuration diagram showing an example of the computer 50 pertaining to this embodiment. The client terminals 10 and the server device 20 pertaining to this embodiment are realized by the computer 50 having the hardware configuration shown in FIG. 2, for example. The computer 50 is an example of an information processing device comprising a processor and a memory.

As shown in FIG. 2, the computer 50 comprises a CPU 51, a RAM 52, a ROM 53, a communication interface 54, an input device 55, a display device 56, an external interface 57, an HDD 58, and the like, which are coupled to one another via a bus line B. The input device 55 and the display device 56 may be configured so that they are connected and used only when necessary.

The CPU 51 is an arithmetic apparatus that reads programs and data from a storage device such as the ROM 53 and the HDD 58 to the RAM 52, and executes various kinds of processing based on the read program and data, so as to realize the control and functions of the entire computer.

The RAM 52 is an example of a volatile semiconductor memory (storage device) for temporarily holding programs and data, and is also used as a work area when the CPU 51 executes various processing.

The ROM 53 is an example of a nonvolatile semiconductor memory (storage device) that can hold programs and data even when the power is switched off. The ROM 53 stores programs and data such as network settings, OS settings and BIOS that are executed when the computer 50 is started up.

The communication interface 54 is an interface for connecting the computer 50 to the network N. This allows the computer 50 to perform data communication via the communication interface 54.

The input device 55 is a device used by a user or an administrator to input various signals. The input device 55 is, for example, a touch panel, operation keys or buttons, a keyboard or a mouse, or another such operation device.

The display device 56 is a device for displaying various kinds of information on the screen to a user or a manager. The display device 56 is, for example, a display such as liquid crystal or organic EL.

The external interface 57 is an interface for connecting so as to enable data communication with an external device. This allows the computer 50 to read from and/or write to a recording medium via the external interface 57. The external device is, for example, a recording medium such as a flexible disk, a CD, a DVD, an SD memory card, a USB memory, or the like.

The HDD 58 is an example of a nonvolatile storage device that stores programs and data. The programs and data that are stored include an OS, which is basic software for controlling the entire computer, and applications that provide various functions in the OS.

A drive device (such as a solid state drive: SSD) using a flash memory as a storage medium may be used instead of the HDD 58.

The client terminals 10 and the server device 20 pertaining to this embodiment can realize various kinds of processing (discussed below) by executing a program in the computer 50 having the hardware configuration described above.

Software Configuration

Server Device

FIG. 3 is a functional block diagram showing an example of the server device 20 pertaining to this embodiment. The server device 20 pertaining to this embodiment is realized by the functional blocks shown in FIG. 3, for example.

The server device 20 pertaining to this embodiment realizes a server controller 200, a server storage unit 220, and a server communication unit 240 by executing a program.

The server controller 200 has a function of executing processing related to various games. The server controller 200 includes a game progression unit 201, a restoration control unit 202, and a display control unit 203.

The game progression unit 201 permits game play by the consumption of the user's possessed points based on game operations received by the client terminal 10 from the user, and controls the subsequent progress of the game.

After the user's possessed points are consumed, the restoration control unit 202 performs restoration control for the possessed points after the consumption. The restoration control unit 202 includes an automatic restoration unit 202A, a manual restoration unit 202B, and a time restoration unit 202C.

After the user's possessed points are consumed, the automatic restoration unit 202A automatically restores the user's possessed points, when a restoration condition is satisfied independent of any restoration operation by the user. In this embodiment, the user's possessed points are automatically restored to a value between a first maximum value and a second maximum value.

The manual restoration unit 202B restores the user's possessed points in response to a restoration operation by the user after the user's possessed points have been consumed. In this embodiment, the user's possessed points are manually restored to a value between the first maximum value and the second maximum value.

After the user's possessed points are consumed, the time restoration unit 202C restores the user's possessed points according to the elapsed time. In this embodiment, the user's possessed points are subjected to time restoration until the first maximum value is reached. Also, only after the user's possessed points have been automatically restored, are the user's possessed points subjected to time restoration until the second maximum value is reached.

The display control unit 203 generates data for various game screens according to the progress of the game controlled by the game progression unit 201, etc., and controls the screen display on the client terminal 10, for example.

The server storage unit 220 has a function of storing information related to various games. The server storage unit 220 includes a character information storage unit 221, a user information storage unit 222, and a quest information storage unit 223.

The character information storage unit 221 is an example of a content information storage unit and stores character information (content information) related to characters, which is an example of content. The character information stored in the character information storage unit 221 includes various characters and so forth used in a game.

The user information storage unit 222 stores user information related to users. The user information stored in the user information storage unit 222 includes the rank of a user, various characters and the user's possessed points, the first maximum value of possessed points associated with the user, and the like.

The quest information storage unit 223 stores quest information related to quests. Various characters and the like that can be acquired in a quest are set in the quest information stored in the quest information storage unit 223.

The server communication unit 240 has a function of communicating with the client terminal 10 via the network N.

Client Terminal

FIG. 4 is a functional block diagram showing an example of a client terminal 10 pertaining to this embodiment. The client terminal 10 pertaining to this embodiment is realized by the functional blocks shown in FIG. 4, for example.

The client terminal 10 pertaining to this embodiment executes a program to realize a client controller 100, a client storage unit 120, a client communication unit 140, an operation receiver 150, and a screen display unit 160. The client controller 100 includes a request transmitter 101 and a response receiver 102. The operation receiver 150 receives an operation from the user operating the client terminal 10. Also, the client controller 100 performs game-related processing on the client terminal 10. The request transmitter 101 transmits a request to the server device 20 based on the operation received by the operation receiver 150 from the user. The response receiver 102 receives a response, such as a processing result, to the request transmitted by the request transmitter 101 to the server device 20.

The client storage unit 120 stores various kinds of information required in the client terminal 10. The client communication unit 140 communicates with the server device 20. The screen display unit 160 displays the screen of the client terminal 10 according to the control of the server 20.

As described above, with the information processing system 1 pertaining to this embodiment, the server device 20 controls the progress and display of the game, but this control may instead be performed by the client terminal 10. More specifically, the configuration may be such that at least some of the functional units of the server controller 200 are not provided to the server controller 200 of the server device 20, but are instead provided to the client controller 100 of the client terminal 10.

Also, the client controller 100 of the client terminal 10 may be a browser type that receives page data written in HTML (Hyper Text Markup Language) or the like, scripts included in the page data, and the like from the server device 20, and performs processing relating to the game. The client controller 100 of the client terminal 10 may also be an application type that performs processing relating to the game based on an installed application.

Game Overview

An overview of the game in this embodiment will now be given. With the game in this embodiment, a battle game is provided in which a user who has consumed his possessed points is allowed to play the game.

The battle game in this embodiment is a game in which an enemy character faces off against a party composed of a plurality of characters, and this enemy character battles the characters constituting the party.

In this battle game, a plurality of quests whose goal is to defeat enemy characters are set according to their degree of difficulty. The user can form a party using his own possessed characters, specify a quest, and do battle with enemy characters.

Then, during battle play, necessary points associated with the designated quest are consumed from the user's possessed points. However, if there are not enough points, the battle play cannot be performed in that designated quest. In that case, the user will have to restore his possessed points.

In this embodiment, the possessed points after the consumption can be automatically restored by satisfying a restoration condition independent of any restoration operation by the user (automatic restoration), can be restored as the result of the user's restoration operation (manual restoration), or can be restored as the result of elapsed time (time restoration). The operations related to automatic restoration, manual restoration, and time restoration will now be described in specific terms.

Operations

Automatic Restoration

FIG. 5 is a flowchart illustrating an operation example related to automatic restoration in the information processing system 1 in this embodiment.

The user performs an operation for starting a battle game on the client terminal 10 while the menu screen is displayed on the screen display unit 160 of the client terminal 10. When the user performs this operation, the operation receiver 150 of the client terminal 10 receives the operation details based on the user's game operation. The request transmitter 101 of the client terminal 10 makes a request to the server device 20 based on the operation details received by the operation receiver 150 from the user. The game progression unit 201 of the server device 20 receives the operation details for starting a battle game from the client terminal 10, and requests the display control unit 203 to execute screen display control so as to display a quest designation screen on the client terminal 10 (step S11).

More specifically, upon receiving a request from the game progression unit 201 to execute screen display control, the display control unit 203 of the server device 20 refers to the quest information stored in the quest information storage unit 223, and control is performed to display the quest designation screen, in which candidate quests for the user are listed, on the screen display unit 160 of the client terminal 10.

FIG. 6 is a configuration diagram showing an example of quest information. This quest information includes categories such as quest ID, name, difficulty level, required points, enemy characters, and acquirable characters.

"Quest ID" is information that uniquely identifies a quest. "Name" is information indicating the quest name. "Difficulty level" is information indicating how easy it is to complete that quest. "Required points" is information indicating the number of points needed to play the game in that quest. "Enemy characters" is information indicating the various characters (including boss characters) that appear in the quest. "Acquirable characters" is information indicating various characters that can be acquired based on a specific probability when that quest has been completed, and is an example of a reward given to the user.

Going back to FIG. 5, the user then performs an operation on the client terminal 10 to designate a quest while the quest designation screen is displayed on the screen display unit 160 of the client terminal 10. When the user performs an operation to designate a quest, the operation receiver 150 of the client terminal 10 receives the operation details based on the user's quest designation (step S12).

Then, the request transmitter 101 of the client terminal 10 makes a request to the server device 20 based on the operation details received by the operation receiver 150 from the user. Upon receiving the operation details from the client terminal 10, the game progression unit 201 of the server device 20 permits game play in the designated quest through the consumption of the user's possessed points (step S13).

More specifically, the game progression unit 201 of the server device 20 acquires the user's possessed points from the user information stored in the user information storage unit 222, and also acquires the points needed for the quest designated by the user from the quest information stored in the quest information storage unit 223. Then, the game progression unit 201 of the server device 20 subtracts the points needed for the quest from the user's acquired possessed points, resulting in the consumption of those possessed points of the user. After this, the game progression unit 201 of the server device 20 permits the user to play the game in that quest and controls the progress of the game.

FIG. 7 is a configuration diagram showing an example of user information. This user information includes categories such as user ID, name, rank, possessed characters, party, possessed points, first maximum value, second maximum value, and number of restoration items.

"User ID" is information that uniquely identifies the user. "Name" is information indicating the user name. "Rank" is information indicating the current game level of the user. In this embodiment, an experience value is accumulated by repeatedly playing the game, and the player's rank is increased every time the accumulated experience value reaches a predetermined level. "Possessed characters" is information indicating one or more of the various kinds of characters that the user currently possesses. "Party" is information indicating the characters that make up the user's party.

"Possessed points" is information indicating the number of points (current value) possessed by the user at the current time. The "first maximum value" is a value that sets a temporary upper limit of possessed points that the user can possess at the current time. In this embodiment, the higher the rank of the user, the higher the first maximum value is set, and the first maximum value is set to increase by a specific number of points (such as 5 points) every time the rank is increased. The second maximum value is a value that sets the actual upper limit of the possessed points that the user can possess at the current time. In this embodiment, the first maximum value is a temporarily set upper limit value, so the user is able to possess points up to the second maximum value, which is the actual upper limit value. The method of determining the second maximum value will be described in detail below. "Number of restoration items" is information indicating the number of restoration items possessed by the user at the current time.

Going back to FIG. 5, next, the automatic restoration unit 202A of the server device 20 determines whether or not a restoration condition for performing automatic restoration has been satisfied based on the result of the game play by the user in that quest (step S14).

More specifically, the automatic restoration unit 202A of the server device 20 determines, as an example of a restoration condition, whether or not the user has succeeded in increasing in rank by playing the game in this quest.

The restoration condition is not limited to this. For instance, the restoration condition may be that the user plays the game in this quest and obtains the highest score. Or, the restoration condition may be that the user has played the game and completed the quest in the shortest time.

If the result is that it is determined that the restoration condition has not been satisfied (No in step S14), this processing is ended. On the other hand, if it is determined that the restoration condition has been satisfied (Yes in step S14), the processing proceeds to the next step S15.

Next, if it is determined that the restoration condition has been satisfied, the automatic restoration unit 202A of the server device 20 automatically restores the user's possessed points to a value between the first maximum value and the second maximum value (step S15).

More specifically, the automatic restoration unit 202A of the server device 20 acquires the first maximum value and the user's possessed points set in the user information stored in the user information storage unit 222, and determines the second maximum value and the possessed points after automatic restoration based on the acquired first maximum value and/or possessed points. The method of determining the second maximum value and the possessed points after automatic restoration will now be described in specific terms.

FIG. 8 is a diagram showing the restoration state (Example 1) of the possessed points before and after automatic restoration. FIG. 9 is a diagram showing the restoration state (Example 2) of the possessed points before and after automatic restoration.

For example, as shown in FIG. 8, if the user's acquired possessed point count is "0" and the first maximum value is "105" (assuming the first maximum value has risen from "100" to "105" due to an increase in rank), then "105," which is the sum of adding the first maximum value "105" to the user's possessed point count of "0," is determined as the possessed point count after automatic restoration, and "210," which is the sum of adding the first maximum value "105" to the user's possessed point count after automatic restoration of "105," is determined as the second maximum value.

Also, for example, as shown in FIG. 9, if the user's acquired possessed point count is "50" and the first maximum value is "105" (assuming the first maximum value has risen from "100" to "105" due to an increase in rank), then "155," which is the sum of adding the first maximum value "105" to the user's possessed point count of "50," is determined as the possessed point count after automatic restoration, and "260," which is the sum of adding the first maximum value "105" to the user's possessed point count after automatic restoration of "155," is determined as the second maximum value.

This is not the only possible method for determining the second maximum value. For instance, when the first maximum value has risen from "100" to "105" due to an increase in rank, "200," which is twice the first maximum value before the increase in rank, may be determined as the second maximum value. Also, "205," which is the first maximum value "100" before the increase in rank plus the first maximum value "105" after the increase in rank, may be determined as the second maximum value. Also, "210," which is twice the first maximum value after the increase in rank, may be determined as the second maximum value.

When the second maximum value and the possessed point count after automatic restoration are thus determined, the automatic restoration unit 202A of the server device 20 updates these values and includes them in the user information stored in the user information storage unit 222.

In this way, if the user can thus satisfy a restoration condition based on the result of having played the game, the user can automatically restore his consumed possessed points all at once to a value between the first maximum value and the second maximum value.

Manual Restoration

FIG. 10 is a flowchart illustrating an operation example related to manual restoration in the information processing system 1 in this embodiment.

When the menu screen is displayed on the screen display unit 160 of the client terminal 10, the user performs an operation on the client terminal 10 for restoring his possessed points. When the user performs this restoration operation, the operation receiver 150 of the client terminal 10 receives the operation details based on the user's game operation (step S21).

The request transmitter 101 of the client terminal 10 makes a request to the server device 20 based on the operation details received by the operation receiver 150 from the user. The game progression unit 201 of the server device 20 receives the operation details for restoring the possessed points from the client terminal 10, and requests the manual restoration unit 202B of the server device 20 to execute restoration processing.

Next, upon receiving a request from the game progression unit 201 to execute restoration processing, the manual restoration unit 202B of the server device 20 reduces the number of the user's restoration items included in the user information stored in the user information storage unit 222, so that the restoration items possessed by the user are used (step S22).

Next, the manual restoration unit 202B of the server device 20 restores the user's possessed points to a value between the first maximum value and the second maximum value by using the restoration items possessed by the user (step S23).

More specifically, the manual restoration unit 202B of the server device 20 acquires the first maximum value and the user's possessed points included in the user information stored in the user information storage unit 222, and determines the possessed points after manual restoration based on the user's acquired possessed points and the first maximum value.

For example, if the user's acquired possessed point count is "0" and the first maximum value is "105," then "105," which is the sum of adding the first maximum value "105" to the user's possessed point count of "0," is determined as the possessed point count after manual restoration.

Also, for example, if the user's acquired possessed point count is "50" and the first maximum value is "105," then "155," which is the sum of adding the first maximum value "105" to the user's possessed point count of "50," is determined as the possessed point count after manual restoration.

When the possessed point count after manual restoration is thus determined, the manual restoration unit 202B of the server device 20 updates the value and includes it in the user information stored in the user information storage unit 222.

In this way, the user can restore his consumed possessed points all at once to a value between the first maximum value and the second maximum value by performing a restoration operation at a desired timing.

Time Restoration

Specific Example 1

FIG. 11 is a flowchart illustrating an operation example related to time restoration in the information processing system 1 in this embodiment (Specific Example 1). Here, time restoration up to the first maximum value (first time restoration) will be described.

When the game progression unit 201 of the server device 20 consumes the user's possessed points, the time restoration unit 202C of the server device 20 refers to the user information stored in the user information storage unit 222, and determines whether or not the user's consumed possessed points have dropped below the first maximum value (step S31).

Next, if it is determined that the user's consumed possessed points have dropped below the first maximum value (Yes in step S31), the time restoration unit 202C of the server device 20 restores those possessed points of the user according to the elapsed time until the first maximum value is reached (step S32).

The time restoration unit 202C in this embodiment restores the user's possessed points one point at a time every three minutes after their consumption. The amount of restoration of the user's possessed points per unit of time is not limited to this, and can be set to a desired amount of restoration.

Next, the time restoration unit 202C of the server device 20 determines whether or not the user's possessed points have reached the first maximum value due to time restoration (step S33).

If the result of this determination is that the user's possessed points have not reached the first maximum value (No in step S33), the processing returns to step S32, and time restoration of the possessed points continues. On the other hand, if it is determined that the user's possessed points have reached the first maximum value (Yes in step S33), the processing proceeds to the next step S34.

Next, if it determined that the user's possessed points have reached the first maximum value, the time restoration unit 202C of the server device 20 halts the processing to restore the user's possessed points according to the elapsed time (step S34).

Thus, when the user's consumed possessed points drop below the first maximum value, the user's possessed points can be gradually restored according to elapsed time until the first maximum value is reached.

Specific Example 2

FIG. 12 is a flowchart illustrating an operation example related to time restoration in the information processing system 1 in this embodiment (Specific Example 2). Here, time restoration after automatic restoration (second time restoration) will be described.

The time restoration unit 202C of the server device 20 refers to the user information stored in the user information storage unit 222, and when the restoration condition is satisfied based on the result of the user's game play (when the user's rank is increased), the automatic restoration unit 202A determines whether or not the user's possessed points have been automatically restored (step S41).

Next, if it is determined that the automatic restoration unit 202A has automatically restored the user's possessed points (Yes in step S41), the time restoration unit 202C of the server device 20 refers to the user information stored in the user information storage unit 222, and determines whether or not the user's possessed points have reached the second maximum value by being automatically restored (step S42).

If the result of this determination is that the user's possessed points have reached the second maximum value by being automatically restored (Yes in step S42), the processing proceeds to step S44 (discussed below). On the other hand, if it is determined that the user's possessed points have not reached the second maximum value by being automatically restored (No in step S42), the processing proceeds to the next step S43.

Next, if it is determined that the user's possessed points have not reached the second maximum value by being automatically restored, the time restoration unit 202C of the server device 20 restores the user's possessed points according to the elapsed time until the second maximum value is reached (step S43).

Unlike the above-mentioned case in which time restoration is performed until the first maximum value is reached (one point is restored every three minutes), the time restoration unit 202C in this embodiment restores the user's possessed points one point at a time every five minutes after the restoration condition is satisfied.

In this embodiment, when the user's possessed points are subjected to time restoration until the second maximum value is reached, the amount of restoration of the user's possessed points per unit of time is less than when the user's possessed points are subjected to time restoration until the first maximum value is reached (the restoration rate is slower). Therefore, the user's possessed points more readily reach the first maximum value, but it is more difficult for the user's possessed points to reach the second maximum value after automatic restoration. Consequently, the user requests a time restoration in which the possessed points more readily reach the first maximum value, and repeatedly plays the game and consumes his possessed points so that they will drop under the first maximum value, and this helps make the game more dynamic.

The amount of restoration of the user's possessed points per unit of time is not limited to this, and can be set to a desired amount of restoration. For instance, in the time restoration of the user's possessed points until the second maximum value is reached, the points may be restored one at a time every two minutes, or two points every three minutes, after the restoration condition is satisfied. In this case, when the user's possessed points are subjected to time restoration until the second maximum value is reached, the amount of restoration of the user's possessed points per unit of time is more than when the user's possessed points are subjected to time restoration until the first maximum value is reached (the restoration rate is faster). Therefore, the user's possessed points readily reach the second maximum value after automatic restoration, so the user restarts game play immediately after reaching the second maximum value and consumes his possessed points, and this helps make the game more dynamic.

Next, if it is determined that the user's possessed points have reached the second maximum value in the processing of step S42 (described above), the time restoration unit 202C of the server device 20 halts the processing to restore the user's possessed points according to the elapsed time (step S44).

Thus, when the user's possessed points are automatically restored, unlike when the user's possessed points are manually restored, or when time restoration is performed until the first maximum value is reached, the user's possessed points can be gradually restored according to the elapsed time until the second maximum value is reached.

Specific Example 3

FIG. 13 is a flowchart illustrating an operation example related to time restoration in the information processing system 1 in this embodiment (Specific Example 3). Here again, as in Specific Example 2 above, time restoration after automatic restoration (second time restoration) will be described. Also, in this Specific Example 3, unlike in Specific Example 2 above, if the user's possessed points are consumed to the point of dropping below the first maximum value after automatic restoration, then time restoration (first time restoration) is subsequently performed until the first maximum value is reached, but time restoration until the second maximum value is reached (second time restoration) was limited.

The time restoration unit 202C of the server device 20 refers to the user information stored in the user information storage unit 222, and when the restoration condition is satisfied based on the result of the user's game play (when the user's rank is increased), the automatic restoration unit 202A determines whether or not the user's possessed points have been automatically restored (step S51).

Next, if it is determined that the automatic restoration unit 202A has automatically restored the user's possessed points (Yes in step S51), the time restoration unit 202C of the server device 20 refers to the user information stored in the user information storage unit 222, and determines whether or not the user's possessed points have reached the second maximum value by being automatically restored (step S52).

If the result of this determination is that the user's possessed points have reached the second maximum value by being automatically restored (Yes in step S52), the processing proceeds to step S57 (discussed below). On the other hand, if it is determined that the user's possessed points have not reached the second maximum value by being automatically restored (No in step S52), the processing proceeds to the next step S53.

Next, if it is determined that the user's possessed points have not reached the second maximum value by being automatically restored, the time restoration unit 202C of the server device 20 refers to the user information stored in the user information storage unit 222, and determines whether or not the game progression unit 201 of the server device 20 has consumed the user's possessed points to the point of their dropping below the first maximum value (step S53).

If the result of this determination is that the user's consumed possessed points have dropped below the first maximum value (Yes in step S53), the processing proceeds to step S55 (discussed below). On the other hand, if it is determined that the user's consumed possessed points have not dropped below the first maximum value (No in step S53), the processing proceeds to the next step S54.

Next, if it is determined that the user's consumed possessed points have not dropped below the first maximum value, the time restoration unit 202C of the server device 20 restores the user's possessed points according to the elapsed time until the second maximum value is reached (step S54).

The time restoration unit 202C in this embodiment restores the user's possessed points by one point at a time every five minutes after the restoration condition is satisfied until the user's possessed points reach the second maximum value. The amount of restoration of the user's possessed points per unit of time is not limited to this, and can be set to a desired amount of restoration.

Next, if it is determined that the user's consumed possessed points have dropped below the first maximum value in the processing of step S53 described above, the time restoration unit 202C of the server device 20 restores the user's possessed points according to the elapsed time until the user's possessed points reach the first maximum value (step S55).

The time restoration unit 202C in this embodiment restores the user's possessed points one point at a time every three minutes after their consumption until the first maximum value is reached. The amount of restoration of the user's possessed points per unit of time is not limited to this, and can be set to the desired amount of restoration.

Next, the time restoration unit 202C of the server device 20 refers to the user information stored in the user information storage unit 222, and determines whether or not the user's possessed points have reached the first maximum value by performing time restoration after dropping below the first maximum value through consumption of the possessed points after automatic restoration (step S56).

If the result of this determination is that the user's possessed points have not reached the first maximum value due to time restoration (No in step S56), the processing returns to step S55, and time restoration of the possessed points continues. On the other hand, if it is determined that the user's possessed points have reached the first maximum value due to time restoration (Yes in step S56), the processing proceeds to the next step S57.

Next, if it is determined that the user's possessed points have reached the second maximum value by automatic restoration in the processing of step S52 described above, and if it is determined that the user's possessed points have reached the first maximum value by time restoration in the processing of step S57 described above, then the time restoration unit 202C of the server device 20 halts the processing to restore the user's possessed points according to elapsed time (step S57).

Thus, when the possessed points have dropped below the first maximum value due to point consumption by the user after automatic restoration, it is possible to limit the time restoration so that it occurs only until the user's possessed points reach the first maximum value.

SUMMARY

As described above, with the information processing system 1 pertaining to this embodiment, when the user consumes his possessed points in the course of game play, time restoration can be performed until those possessed points reach a first maximum value, and after the automatic restoration, time restoration can be performed until a second maximum value is reached. Therefore, even if the user's possessed points are automatically restored against his wishes, time restoration will subsequently be performed until the possessed points reach the second maximum value. As a result, the user does not need to repeatedly play the game after the automatic restoration and consume his possessed points until they drop below the first maximum value so as not to lose the points allotted for the time restoration, so the user can easily obtain the points allotted for the time restoration even after automatic restoration.

Time Restoration after Automatic Restoration

In the above embodiment, an example was given of limiting the user's possessed points so as to be restored only until the first maximum value is reached when the user's possessed points have dropped below the first maximum value due to consumption of points after automatic restoration, but, in addition to this condition, it is also possible to limit the restoration as follows.

For example, it is possible to limit restoration such that the time restoration unit 202C of the server device 20 does not perform time restoration on the user's possessed points after consumption in the event that the user's possessed points have not been consumed to the point of dropping below the first maximum value (such as when the points do not drop below the first maximum value even after the consumption of the points allotted for at least one game play (a specific number of times)) after the automatic restoration and before time restoration until the user's possessed points have reached the second maximum value.

It is also possible, for example, to use a configuration in which, when a user has attained a certain rank, if the user's possessed point count reaches the second maximum value at least a specific number of times, then time restoration up to the second maximum value is subsequently limited.

It is also possible, for example, to prepare a time restoration gauge for enabling time restoration, and limit subsequent time restoration up to the second maximum value when this time restoration gauge reaches its upper or lower limit.

It is also possible, for example, to determine in advance the period during which time restoration is possible (such as the period from midnight to 6:00 a.m., the period until the date changes, or the period until the week changes), and limit the time restoration up to the second maximum value except for this period.

It is also possible to appropriately combine these conditions given as examples above.

Also, in the above embodiments, if the user's possessed points have dropped below the first maximum value due to the consumption of points after automatic restoration, time restoration is performed until the first maximum value is reached. However, during this restoration, the user's possessed points may again exceed the first maximum value due to automatic restoration or manual restoration. If that happens, a limitation is imposed after manual restoration so that time restoration will not be performed until the user's possessed points reach the second maximum value, but after automatic restoration, the system is controlled so that time restoration will be performed until the second maximum value is reached. Here, it is also possible to impose a limitation so that time restoration is not performed until the second maximum value is reached even after automatic restoration.

Special Items

In the above embodiments, when the user completes a quest, a special item is awarded that permits time restoration from the first maximum value to the second maximum value, and the user may make use of this special item so that time restoration can be performed to restore the user's possessed points up to the second maximum value after using the special item.

Content

In the above embodiment, a character that is set as character information is described as an example of content, but the content is not limited to this. For example, the content may be an item, a card, a figure, an avatar, or the like.

The invention claimed is:

1. An information processing device, comprising:
   a user information storage unit that stores user information in which a user's possessed points are set;
   a game progression unit that permits game play by the consumption of the user's possessed points;
   an automatic restoration unit that automatically restores the user's possessed points to a value between a first maximum value and a second maximum value, when a restoration condition is satisfied independent of any restoration operation by the user;
   a manual restoration unit that restores the user's possessed points to a value between the first maximum value and the second maximum value by means of a restoration operation by the user; and
   a time restoration unit that restores the user's possessed points according to the elapsed time until the first maximum value is reached, and that, after the user's possessed points have been restored by the automatic restoration unit from among the automatic restoration unit, the manual restoration unit, and the time restoration unit, restores the user's possessed points according to the elapsed time until the second maximum value is reached.

2. The information processing device according to claim 1,
   wherein the time restoration unit only restores the user's possessed points up until the first maximum value is reached according to the elapsed time when the user's possessed points have dropped below the first maximum value due to consumption by the game progression unit after automatic restoration by the automatic restoration unit.

3. The information processing device according to claim 1,
   wherein the time restoration unit does not restore the user's possessed points according to the elapsed time after the consumption when the user's possessed points are consumed by the game progression unit after the automatic restoration by the automatic restoration unit and before the user's possessed points are restored to the second maximum value according to the elapsed time, and the user's consumed possessed points have not dropped below the first maximum value.

4. The information processing device according to claim 1,
   wherein the amount of restoration of the user's possessed points per unit of time by the time restoration unit is different when the user's possessed points are restored according to the elapsed time until the first maximum value is reached, and when the user's possessed points are restored according to the elapsed time until the second maximum value is reached.

5. The information processing device according to claim 1,
   wherein the second maximum value is a value that is added to the first maximum value with respect to the value automatically restored by the automatic restoration unit.

6. A computer program product comprising a non-transitory computer readable medium storing a computer program comprising instructions which, when executed by a computer comprising a processor and a memory, causes the computer to function as:
   a user information storage means for storing user information in which a user's possessed points are set;
   a game progression means for permitting game play by the consumption of the user's possessed points;
   an automatic restoration means for automatically restoring the user's possessed points to a value between a first maximum value and a second maximum value, when a restoration condition is satisfied independent of any restoration operation by the user;
   a manual restoration means for restoring the user's possessed points to a value between the first maximum value and the second maximum value by means of a restoration operation by the user; and
   a time restoration means for restoring the user's possessed points according to the elapsed time until the first maximum value is reached, and for, after the user's possessed points have been restored by the automatic restoration unit from among the automatic restoration unit, the manual restoration unit, and the time restoration unit, restoring the user's possessed points according to the elapsed time until the second maximum value is reached.

* * * * *